(No Model.)
G. H. CAUGHREAN.
MACHINE FOR SACKING, WEIGHING, AND REGISTERING GRAIN.
No. 320,218. Patented June 16, 1885.
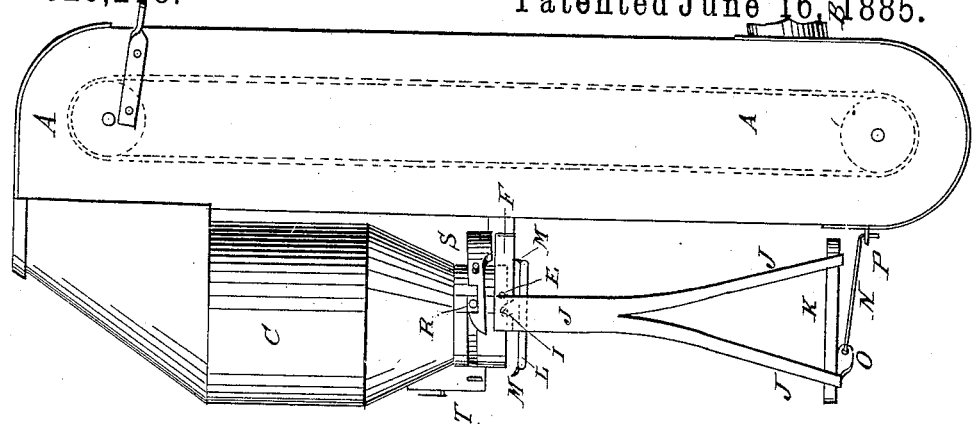
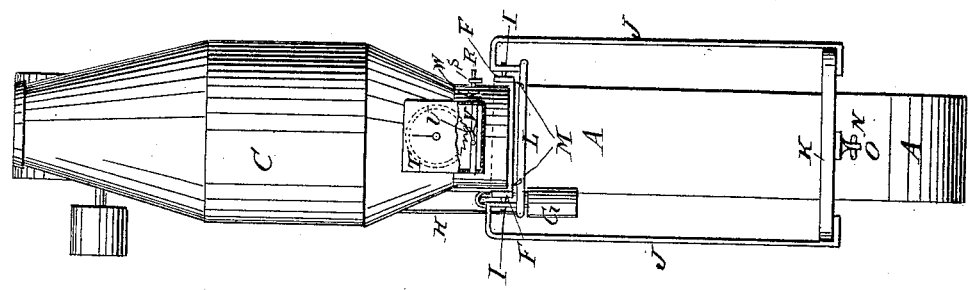
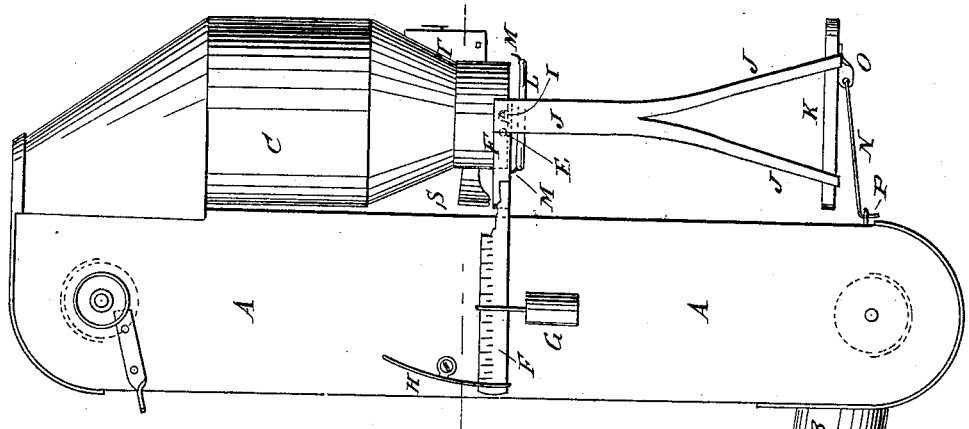
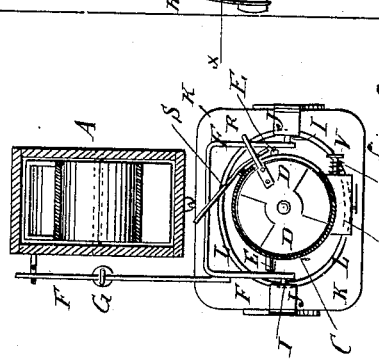
WITNESSES:
Anas Nida
Edward McClark
INVENTOR:
George Henry Caughrean
BY
ATTORNEYS.

United States Patent Office.

GEORGE HENRY CAUGHREAN, OF PLEASANT HILL, MISSOURI.

MACHINE FOR SACKING, WEIGHING, AND REGISTERING GRAIN.

SPECIFICATION forming part of Letters Patent No. 320,218, dated June 16, 1885.

Application filed November 28, 1884. (No model.)

*To all whom it may concern:*

Be it known that I, GEORGE HENRY CAUGHREAN, of Pleasant Hill, in the county of Cass and State of Missouri, have invented a new and useful Improvement in Machines for Sacking, Weighing, and Registering Grain and other Substances, of which the following is a full, clear, and exact description.

Reference is to be had to the accompanying drawings, forming a part of this specification, in which similar letters of reference indicate corresponding parts in all the figures.

Figure 1 is a side elevation of one of my improved machines. Fig. 2 is a front elevation of the same. Fig. 3 is a side elevation of the same, showing the opposite side from that shown in Fig. 1. Fig. 4 is a sectional plan view of the same, taken through the line $x\ x$, Fig. 1, the cut-off being shown open. Fig. 5 is a plan view of the under side of the cut-off shown open.

The object of this invention is to provide machines for sacking, weighing, and registering grain and other substances as they come from thrashing-machines, corn-shellers, mills, and other places, by the use of which the said operation will be facilitated and accuracy secured.

The invention relates to a sacking, weighing, and registering machine constructed with an elevator, a hopper to receive the substance, a holder to receive the sack, a scale beam and weight for weighing the substance, a cut-off provided with a spring and arm for stopping the outflow of the substance, a trigger for holding and releasing the cut-off, and a register for registering the amount of the substance sacked, as will be hereinafter fully described, and then pointed out in the claims.

A represents an ordinary elevator, which is designed to be connected with the discharge-spout B of a thrashing-machine or other place from which the grain or other substance to be sacked, weighed, and registered is discharged.
From the elevator A the substance is discharged into the hopper C, which is preferably made cylindrical in form, and which has in its bottom discharge-openings, opened and closed as required by a cut-off, D.

To the opposite sides of the lower part of the hopper are attached pivots E, upon which is pivoted the forked forward end of the scale-beam F. The scale-beam F extends back along the side of the elevator A, and has division-marks upon its side, to serve as a guide in adjusting the balancing-weight G, according as more or less of the material is to be put into each sack. The free end of the scale-beam F plays in a keeper, H, attached to the elevator A, and which supports the said end when overbalanced by the weight G.

To the ends of the forks of the scale-beam F, a little in front of the pivots E, are attached pivots I, upon which are pivoted the downwardly-bent upper ends of the bars J.

To the forked lower ends of the bars J is attached a platform, K, upon which the bottom of the sack to be filled rests.

To the downwardly-bent upper ends of the bars J is attached, or upon them is formed, a ring, L, provided with points M, to receive and hold the mouth of the sack while the said sack is being filled.

The platform K is kept from swinging about by a hook, N, hinged to a lug, O, attached to the lower side of the said platform K, and hooking in a staple, P, attached to the elevator A.

The cut-off D is held closed by a coiled spring, Q, attached to it and to its pivot. To the cut-off D is attached an arm, R, which projects through a slot in the side of the lower part of the hopper, to serve as a handle in opening the cut-off, and for the shoulder of the trigger S to engage with to hold the said cut-off open. The forward end of the trigger S is beveled, as shown in Fig. 3, so that it will engage with the arm R automatically as the said arm is swung around in opening the cut-off D.

The trigger S is pivoted to the side of the lower part of the hopper C, and its rear end extends back and rests upon the fork of the scale-beam F, so that it will be operated to release the arm R and allow the cut-off D to be closed by the spring Q when the desired weight has been received in the sack and the said beam is tripped thereby.

To the front of the lower part of the hopper C is attached a register, T, which is operated by a pawl, U, pivoted to a rod, V, sliding in bearings in the case of a register, T, and pushed forward by the arm R as it is swung forward when released from the trigger S. The sliding rod V is drawn back when the cut-off is closed by the spring W, placed upon the said rod, between its head and the side of the hopper C.

In using the machine a sack is placed upon the sack-holder, and the arm R is swung back by hand to open the cut-off D until the said arm is caught and held by the trigger S, allowing the grain to flow out of the said hopper. When the required amount of the substance has been received in the sack, its weight trips the scale-beam F, and operates the trigger S to release the cut-off and allow the said cut-off to close, until the filled sack has been removed and replaced by an empty sack, when the cut-off is again opened and the substance allowed to flow out into the sack, and so on, as before described.

Having thus described my invention, I claim as new and desire to secure by Letters Patent—

1. In a sacking, weighing, and registering apparatus, the combination, with a hopper and a register at one side of the same, of a spring-actuated valve in the bottom of the hopper, provided with a projecting arm for operating the register, substantially as herein shown and described.

2. In a sacking, weighing, and registering apparatus, the combination, with the hopper C, having a slot in its bottom, and the register T, provided with the projecting arm for operating the same, of the spring-actuated valve D, provided with the arm R, substantially as herein shown and described.

3. In a sacking, weighing, and registering machine, the combination, with the hopper C and the scale-beam F, of the cut-off D, having spring Q and arm R, and the trigger S, substantially as herein shown and described, whereby the discharge from the hopper will be stopped automatically when the said scale-beam is tripped, as set forth.

4. In a sacking, weighing, and registering machine, the combination, with the hopper C and the cut-off D, having spring Q and arm R, of the register T, the sliding rod V, carrying a pawl, U, and the spring W, substantially as herein shown and described, whereby the said register will be operated by the closing of the said cut-off, as set forth.

GEORGE HENRY CAUGHREAN.

Witnesses:
A. C. SHEPARD,
L. P. SUMMERS.